No. 878,011. PATENTED FEB. 4, 1908.
F. H. NOBLE.
PIN AND THE LIKE.
APPLICATION FILED AUG. 1, 1904.
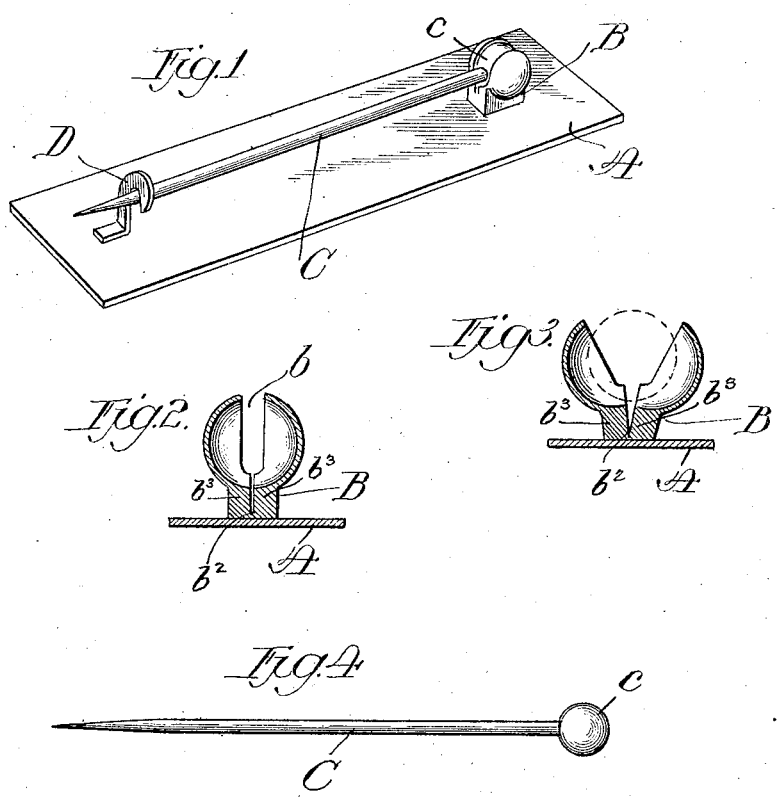

UNITED STATES PATENT OFFICE.

FRANK H. NOBLE, OF CHICAGO, ILLINOIS.

PIN AND THE LIKE.

No. 878,011.　　　Specification of Letters Patent.　　　Patented Feb. 4, 1908.

Application filed August 1, 1904. Serial No. 219,044.

*To all whom it may concern:*

Be it known that I, FRANK H. NOBLE, a citizen of the United States, residing at Chicago, in the county of Cook and State of Illinois, have invented certain new and useful Improvements in Pins and the Like, of which the following is a specification.

My invention has relation to brooches, badges and pin structures generally, and the object thereof is to provide a pin fastening of novel form and construction and associated and coöperating with a pin joint in a novel and advantageous manner.

Heretofore fastening pins have been connected or jointed so as to be simply pivoted, in order that they may be attached and detached from the usual catch. In practice it is found that the pin proper becomes bent outwardly by the goods or fabric to which it may be secured, so that the efficiency of the pin is impaired. According to my invention I provide a fastening pin which is not only pivoted but also rotatable, with the result that the pin tends to straighten itself in repeated use, that is to say, although the pin may be bent on its first application it becomes straightened the next time it is used.

In the drawing, Figure 1 is a perspective view of a brooch embodying my invention; Fig. 2 a sectional view of the joint and plate of the brooch; Fig. 3 a view similar to Fig. 2 but illustrating the position of the two portions of the joint before the pin is assembled; and Fig. 4 a plan view of the pin.

It will be understood that my invention may be applied to pin structures generally, such as badges, brooches and the like, but in the present instance I have chosen to show it applied to a brooch, and will now proceed to explain my invention in connection therewith, without the intention of limitation thereto.

As shown in the drawing, the brooch plate A has a joint B in which is pivoted the peculiarly constructed pin C. A catch D is provided on the brooch plate to coöperate with the pin in the usual and well known manner. As illustrated more particularly in Figs. 2 and 3, the joint B, which is soldered at its base to the plate A, is provided with a bifurcated base portion or pedestal $b^2$, the two upwardly extending divisions or arms $b^3$ of which carry semi-circular portions forming sockets having substantially circular rims, between which is left a space or slot $b$ for a purpose hereinafter made apparent.

The fastening pin C comprises a straight body portion as usual, but its inner end or head is enlarged and made spherical. This head is adapted to be received within the sockets formed by the joint B and the pin portion is arranged to move freely in the slot $b$ in such joint. In assembling the pin and joint, the two socket portions of the joint are distended as illustrated in Fig. 3, and, after the head of the pin is inserted therein, such portions of the joint are pinched together upon the head of the pin, but not tight enough to hold the latter against rotation. It will thus be evident that a pin constructed and arranged as above described is not only capable of the pivotal movement usual in structures of this character, but is also capable of rotation, with the result, as already suggested, that owing to such capability of rotation the pin after being once bent, may be bent back again by the act itself of attaching it to the goods a second time. Moreover, the construction as herein illustrated is extremely simple and inexpensive but nevertheless efficient for the purpose intended.

I claim:

1. In a device of the class described, the combination with a fastening pin having an enlarged spherical end, of a bifurcated block forming a base or pedestal adapted to be secured at its bottom end to the body of the device, the two divisions of said block supporting two substantially hemispherical socket portions integral with such divisions and which coöperate to form a spherical socket adapted to receive the enlarged spherical end of the pin; substantially as described.

2. In a device of the class described, the combination with a fastening pin having an enlarged spherical end, of a bifurcated block forming a base or pedestal adapted to be secured at its bottom end to the body of the device, the two divisions of said block supporting two circular rims integral with such divisions and coöperating to form a joint in which the enlarged spherical end of the pin is pivotally held so as to be capable of rotation; substantially as described.

FRANK H. NOBLE.

Witnesses:
　LOUIS B. ERWIN,
　AMELIA WILLIAMS.